Dec. 11, 1934.    H. A. BERKMAN    1,983,965
HOLDER AND EXPANDER FOR PISTON RINGS
Filed April 29, 1933    2 Sheets-Sheet 1
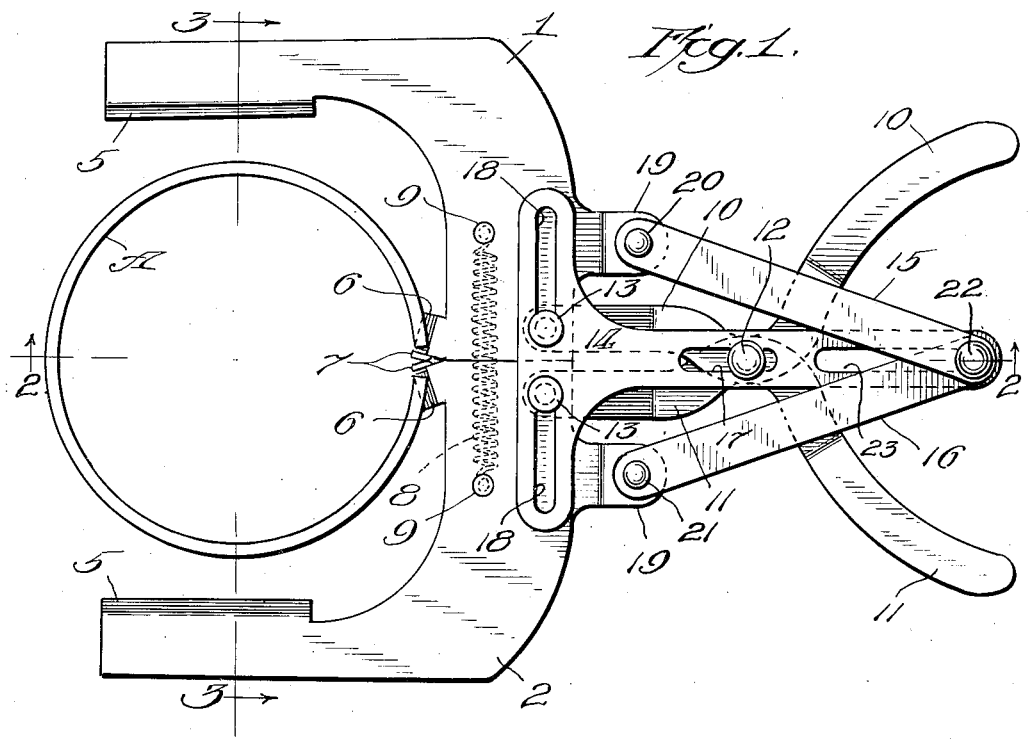
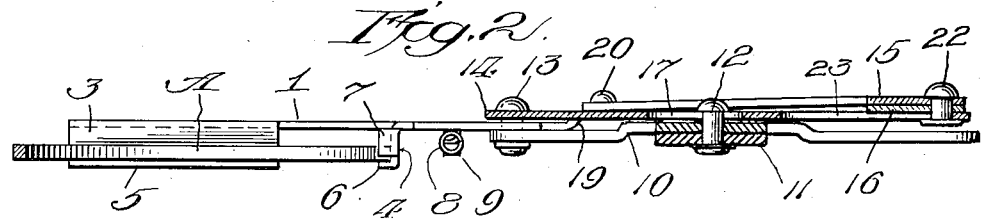
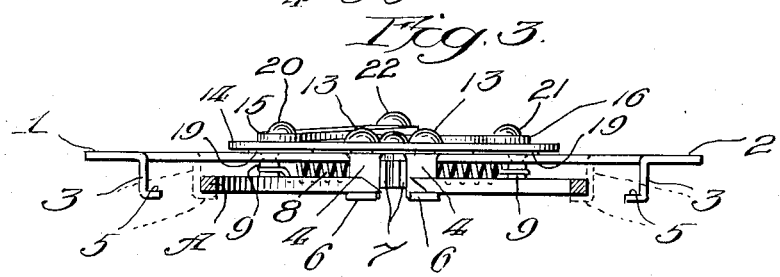

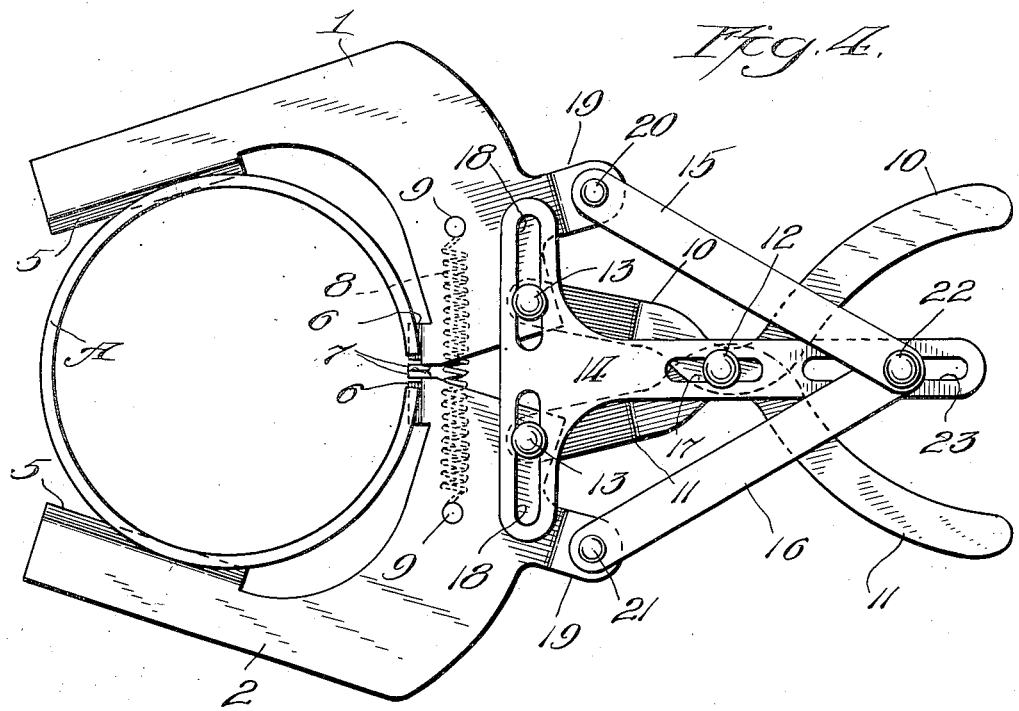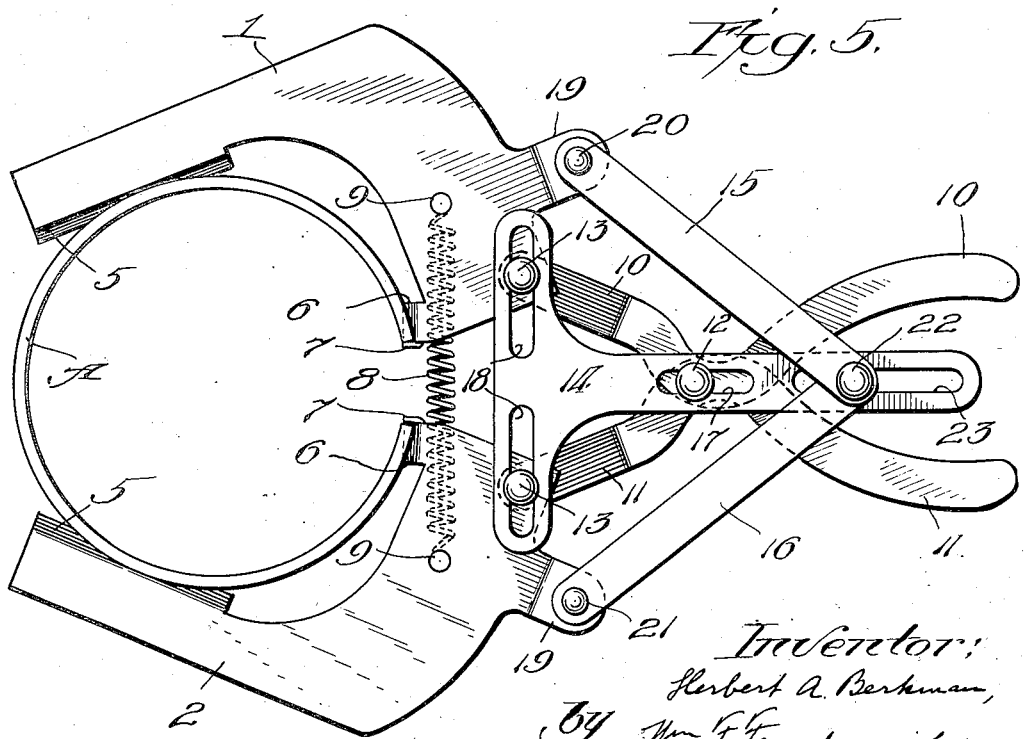

Patented Dec. 11, 1934

1,983,965

UNITED STATES PATENT OFFICE 1,983,965

HOLDER AND EXPANDER FOR PISTON RINGS

Herbert A. Berkman, Chicago, Ill., assignor to Zim Manufacturing Company, a corporation of Illinois Application April 29, 1933, Serial No. 668,535

8 Claims. (Cl. 29—86.4)

The internal diameters of the piston rings of automobile engines, when the rings are not being constrained, is less than the external diameters of the pistons for which the rings are adapted. Therefore, in order to apply the rings to or remove them from a piston they must be expanded so as to make them large enough to be slipped over the piston. These rings are small and fragile and, if they are not carefully handled in applying them to and removing them from a piston, they break. While it is not so difficult to expand the rings in order to slip them on the pistons, it is less easy to expand them while they are seated in the piston grooves, so that they may be removed. If a screw driver or the like is inserted into the gap in a piston ring or behind the piston ring, there is not only danger of breaking the ring but, almost always, the ring will be marred so as to have burrs thereon and thus lose its efficiency.

The object of the present invention is to produce a simple and novel tool by means of which a piston ring may be held and properly expanded, both while on a piston and while being removed from the piston, without danger of breaking or marring the ring, and thereby make it possible quickly and easily to apply and remove piston rings without injury to the same.

A further object of the present invention is to produce a tool of the character specified which will expand a ring more or less uniformly in all directions instead of giving it a pronounced oval shape as is the case when the free ends of a divided piston ring are simply drawn apart.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a plan view of a tool embodying the present invention, the tool being about to be closed on a piston ring; Fig. 2 is a section on line 2—2 of Fig. 1; Fig. 3 is a section on line 3—3 of Fig. 1, showing in dotted lines the positions of the holding or gripping fingers after being closed on the ring; Fig. 4 is a view similar to Fig. 1, showing the tool closed upon the ring, with the parts in position to begin the expanding operation; and Fig. 5 is a view similar to Figs. 1 and 4, showing the positions at the end of the expanding operation.

Referring to the drawings, 1 and 2 represent what may be termed curved fingers. These fingers are illustrated as taking the form of L-shaped plates, one arm of each of which is wider than the other. Normally the two fingers make edge to edge contact at their bases, namely, at the free ends of the broader or wider arms. The fingers are similar to each other so that, when they are engaged, edge to edge, they are symmetrically disposed with respect to a longitudinal center line which is the line of the joint between the two fingers. Since it is preferable to give to the fingers a greater thickness than that of the plate material of which they are constructed, I prefer to flange the free arm of each finger downwardly along its inner edge, as indicated at 3, 3, and to provide the base portion of each finger with a similar downwardly-extending flange 4 placed close to the extreme end.

When the two fingers are placed together as explained and as shown in Fig. 1, they form a U between the arms of which a piston ring A to be expanded may be inserted. Normally the arms of the U are farther apart than the diameter of the largest ring to be accommodated. The first step in preparation for the expansion of the ring, after it has been inserted between the arms of the U, is to manipulate the fingers so that the free ends thereof will come in contact with the periphery of the ring. In order to prevent the ring from slipping out of the plane of the fingers, I provide each of the flanges 3 and 4 with an inwardly-extending ledge, as indicated at 5 and 6, respectively. When the tool is closed on the ring, the flanges 3 and 4 engage with the periphery whereas the ledges 5 and 6 underlie the ring and hold it level and against dropping down. The parts are so proportioned that the flanges 3, 3 touch the ring at points spaced more than ninety degrees apart from the joint between the bases of the two fingers; so that pressure on the ring through the flanges 3, 3 tends to push the ring farther into the U instead of squeezing it out as would be the case if the flanges 3, 3 diverged from each other instead of converging. After a ring has been gripped in the device it is expanded by moving the base portions of the fingers bodily away from each other. Means are provided for interlocking the base portions of the fingers with the ends of the divided ring so that, when the bases of the fingers are drawn apart, they carry the corresponding ends of the ring with them. This may conveniently be accomplished by forming on each of the flanges 4, 4 a vertical lip 7; these lips being placed at the meeting edges of the flanges so that they abut against each other when the fingers are in the normal positions illustrated in Fig. 1. The lips 7, 7 lie at the central axis or center line of the tool and project into the space within the U, so that, if the piston ring is properly placed, these lips will enter the gap between the ends of the ring, as shown. In using the tool, the ring is first placed into the space within the U, as shown in Fig. 1, with the lips 7, 7 entered in the gap in the ring. The fingers are then moved, by swinging them about the line of contact between the lips 7, 7 as a hinge axis, to close them upon the ring, as shown in Fig. 4. At this time the lips 7, 7 are still in contact with each other and no expansion of the ring has occurred. The base portions of the fingers are now pulled apart; the free ends of the fingers being fulcrumed on the periphery of the ring, drawing the ends of the ring apart, as shown in Fig. 5. It will be seen that since the flanges 3, 3 are caused to press against the periphery of the ring while the ends of the ring are being spread, the tendency will be to cause an expansion of the ring in the direction of the center line or longitudinal axis of the tool, as well as transversely.

The fingers are normally held in edge contact with each other by a tension spring 8 that underlies the base portion of the fingers and extends across the joint between them at right angles to the center line. The ends of the spring are fastened to pins 9, 9, one on each of the fingers. The spring is under an initial tension so that it tends constantly to hold the fingers in edge contact with each other. The fingers are operated by means of a pair of similar levers 10 and 11 pivotally connected together between the ends thereof by a pin 12. One end of each lever is pivotally connected to one of the fingers by a pin 13; the pins 13 being close to the rear edges and near the meeting edges of the fingers. The line connecting pivot pins 13 is spaced apart from the lips 7 a considerable distance along the center line or central axis of the tool and the spring 8 lies between the lips 7 and the pivot pins 13. The free ends of the levers 10 and 11 serve as grips that may be taken in the palm of the hand and pressed together. The levers do not cross each other so that, when their outer or free ends are pressed together, their inner ends, which are connected to the fingers, are moved apart. Normally the spring not only holds the base ends of the fingers in edge contact with each other but also keeps the outer or free ends of the operating levers or handles spread apart. Since the spring is behind the lips 7, pressure on the free ends of the levers to bring them together and thus spread the pivot pins 13, 13 apart, results in rocking movements of the fingers about the line of contact between the lips 7, 7 as an axis; these lips remaining in engagement with each other until the flanges 3, 3 have come into contact with the periphery of the ring, as shown in Fig. 4. Further pressure on the levers, bringing their free ends still closer together, results in a lifting of the base ends of the fingers away from each other; the fingers now being fulcrumed on the periphery of the ring at the points of contact of the flanges 3, 3 with the ring, and the lips 7, 7 being drawn apart and the ring expanded as heretofore explained.

No further elements are needed to provide for the mere holding and expanding of a ring. However, it is desirable that all of the parts on one side of the center line of the tool always move in unison with and through exactly the same angular distances with respect to said center line as do the corresponding parts on the other side. In other words, it is preferable that the tool have stability so that what may be termed the jaw end will not flop bodily toward one side or the other. I have therefore provided equalizing means whereby the two halves of the tool will always be symmetrically disposed with respect to the central axis. These means comprise a plate 14 and two similar links 15 and 16. The plate 14 is shown as being T-shaped, the long arm overlying the operating levers and extending in the direction of the central axis of the tool, and the cross arm overlying the rear portions of the base ends of the fingers. The long arm of the plate 14 has a central longitudinal slot 17 through which the pivot pin 12 extends; this pivot pin being made sufficiently long for that purpose. The cross arm of the plate 14 has therein a slot 18 extending at right angles to the central axis of the tool. In the arrangement shown, this slot is made in two sections, each of which overlies the base end of one of the fingers. Each of the pivot pins 13 extends through the slot 18 or through the corresponding section of that slot where there are two sections; the pivot pins 13 being made sufficiently long for that purpose. The base portion of each finger is provided with a rearwardly-extending ear 19. To one of these ears there is secured, by means of a pivot pin 20, the front end of the link 15. To the other ear I secure the front end of the link 16 by means of a pin 21. The rear ends of the links 15 and 16 are secured together by a pin 22 which also extends through the slot 17, or, if preferred, through a separate elongated slot 23 that is aligned with the slot 17; the slots 17 and 23, in effect, constituting sections of a single elongated longitudinal slot. The plate 14 and the links 15 and 16 so tie the actuating levers and the fingers together that no part of either finger can make a movement without producing a similar movement in the corresponding part of the other finger.

The matter of using my improved tool has probably been sufficiently explained in connection with the description of its construction. It need therefore only be pointed out that, having my tool, it is necessary that the workmen simply set a piston ring between the jaws of the same and press the handles together, in order to expand the ring sufficiently to slip it down over the piston. Also, when it is desired to remove a ring from its groove in a piston, the tool is applied to the ring just as though the piston were not there, and the ring is then expanded and lifted. It will be seen that the ring in its expanded condition is very nearly round, so that it need be stressed only to a minimum degree in order to place it in a condition to pass over the piston. Furthermore, there is a symmetrical distribution of the expanding forces to which a ring is subjected by the tool, so that the danger of permanent distortion or of breakage in manipulating the ring to apply or remove it may be said to be entirely eliminated. The parts of the tool that contact with the ring all have smooth, flat surfaces, so that there is no danger of scoring the ring or forming burrs thereon while it is held in the tool. Consequently, piston rings may be applied and removed quickly and easily, even by unskilled persons without the slightest danger of damaging the rings.

It will be seen that one of the important characteristics of the tool is that it may be operated with one hand. In other words, the hand that places the ring in the tool is left entirely free as soon as the tool has been closed on the ring to the extent shown in Fig. 4. Also, in applying the tool to a ring that is on a piston, the tool is held in one hand while the other hand need be employed only to the extent of pressing the ring laterally to expose the gap and permit the lips on the tool to be entered in the gap. After the preliminary closure of the tool, whether the ring be on the piston or detached therefrom, only one hand is required to complete the handling of the ring and its release from the tool.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. A tool for holding and expanding piston rings, comprising two curved fingers adapted to lie in the plane of and on opposite sides of a divided piston ring, said fingers having free ends and base ends which latter ends are normally in contact with each other elements at the base ends of said fingers adapted to extend into the gap between the ends of the ring, the fingers being of such length and shape that when the free ends are swung toward each other about the point of contact of said elements as a center the free ends of said fingers will engage with the periphery of the ring at two points each spaced at least ninety degrees from the said gap, and means to swing the free ends of said fingers into engagement with the periphery of the ring and then spread the fingers apart at their bases.

2. A tool for holding and expanding piston rings, comprising two curved fingers adapted to lie in the plane of and on opposite sides of a divided piston ring, said fingers having free ends and base ends which latter ends are normally in contact with each other elements at the base ends of said fingers adapted to extend into the gap between the ends of the ring, the fingers being of such length and shape that when the free ends are swung toward each other about the point of contact of said elements as a center the free ends of said fingers will engage with the periphery of the ring at two points each spaced at least ninety degrees from the said gap, and means to swing the free ends of said fingers through equal angles into engagement with the periphery of the ring and then move their base ends through equal distances away from each other to widen the gap in the ring.

3. A tool for holding and expanding piston rings, comprising two curved fingers adapted to lie in the plane of and on opposite sides of a divided piston ring, said fingers having free ends and base ends which latter ends are normally in contact with each other elements at the base ends of said fingers adapted to extend into the gap between the ends of the ring, the fingers being of such length and shape that when the free ends are swung toward each other about the point of contact of said elements as a center the free ends of said fingers will engage with the periphery of the ring at two points each spaced at least ninety degrees from the said gap, ledges on the fingers underlying and supporting the ring in all relative positions of the fingers, and means to swing the free ends of said fingers through equal angles into engagement with the periphery of the ring and then move their base ends through equal distances away from each other to widen the gap in the ring.

4. In a tool of the character described, two similar curved fingers contacting with each other at their bases along a center line the extension of which lies midway between the free ends of the fingers, lips projecting inwardly from the bases of the fingers at said line and adapted to be entered in the gap of a divided piston ring disposed between the fingers, connected operating levers for the fingers pivotally connected to the bases thereof toward the outer edges, and a tension spring extending across the joint between the fingers between said lips and the pivotal connections of the fingers with the levers and fastened at its ends to the fingers so as yieldingly to hold the bases of the fingers in contact with each other until the free ends of the fingers have closed upon said ring and thereafter permit the bases to separate and effect the expansion of the ring.

5. In a tool of the character described, two similar curved fingers contacting with each other at their bases along a center line the extension of which lies midway between the free ends of the fingers, lips projecting inwardly from the bases of the fingers at said line and adapted to be entered in the gap of a divided piston ring disposed between the fingers, connected operating levers for the fingers pivotally connected to the bases thereof toward the outer edges, a tension spring extending across the joint between the fingers between said lips and the pivotal connections of the fingers with the levers and fastened at its ends to the fingers, and equalizing devices connecting together the fingers and the operating levers to cause the fingers in all of their relative positions to be symmetrically disposed with respect to said center line.

6. In a tool of the character described, two similar curved fingers engaged edge to edge at their bases along a center line the extension of which lies midway between the free ends of the fingers, each finger having on the inner edge at the base a lip contacting with the lip on the other finger, said lips being adapted to enter the gap in a divided piston ring positioned between said arms, a pair of similar operating levers pivotally connected between their ends, one end of each lever being pivotally connected to one of the fingers near said center line and toward the outer edge of that finger, a tension spring extending across the joint between said fingers between the lips and the adjacent ends of the operating levers and secured at its ends to the fingers, a plate overlying said levers and a portion of the base of each finger, said plate having a slot along said center line through which the pivot connecting the levers together projects and having also a transverse slot in the part overlying said fingers, and pins fixed to the fingers and extending through said transverse slot.

7. In a tool of the character described, two similar curved fingers engaged edge to edge at their bases along a center line the extension of which lies midway between the free ends of the fingers, each finger having on the inner edge at the base a lip contacting with the lip on the other finger, said lips being adapted to enter the gap in a divided piston ring positioned between said arms, a pair of similar operating levers pivotally connected between their ends, one end of each lever being pivotally connected to one of the fingers near said center line and toward the outer edge of that finger, a tension spring extending across the joint between said fingers between the lips and the adjacent ends of the operating levers and secured at its ends to the fingers, a plate overlying said levers and a portion of the base of each finger, said plate having a slot along said center line through which the pivot connecting the levers together projects and having also a transverse slot in the part overlying said fingers, pins fixed to the fingers and extending through said transverse slot, two similar links each of which is pivotally connected at one end to one of the fingers, and a pin connecting together the other ends of said links and engaged in the first-mentioned slot in said plate.

8. In a tool of the character described, two similar curved fingers contacting with each other at their bases along a center line the extension of which lies midway between the free ends of the fingers, lips projecting inwardly from the bases of the fingers at said line and adapted to be entered in the gap of a divided piston ring disposed between the fingers, connected operating levers for the fingers pivotally connected to the bases thereof toward the outer edges, equalizing devices connecting together the fingers and the operating levers to cause the fingers in all of their relative positions to be symmetrically disposed with respect to said center line, and spring means yieldingly holding said fingers in contact with each other at their bases, while permitting them to rock about the lips as a center to close the free ends of the fingers upon the piston ring and then to permit the lips to be drawn apart to expand the ring.

HERBERT A. BERKMAN.